United States Patent
Livingston (12)

(10) Patent No.: US 6,362,632 B1
(45) Date of Patent: Mar. 26, 2002

(54) BALANCED CHARGE PUMP CAPACITIVE MATERIAL SENSOR

(75) Inventor: Richard A. Livingston, Webster Graves, MD (US)

(73) Assignee: BECS Technology, Inc., St. Louis, MO (US)

( * ) Notice: Subject to any disclaimer, the term of this patent is extended or adjusted under 35 U.S.C. 154(b) by 0 days.

(21) Appl. No.: 09/578,010

(22) Filed: May 24, 2000

(51) Int. Cl.$^7$ .......................... G01R 27/26; G01F 23/00; H03K 17/945
(52) U.S. Cl. .................. 324/661; 324/629; 324/678; 73/304 C; 327/517
(58) Field of Search ................................ 324/629, 661, 324/678, 76.65, 76.66, 76.67; 73/304 C; 340/620; 327/517

(56) References Cited

U.S. PATENT DOCUMENTS

| | | | | | |
|---|---|---|---|---|---|
| 4,194,395 A | * | 3/1980 | Wood | .................. | 73/304 C |
| 4,345,167 A | * | 8/1982 | Calvin | .................. | 327/517 |
| 4,515,015 A | * | 5/1985 | Kuhlman | .................. | 73/304 C |
| 4,752,727 A | * | 6/1988 | Schneider | .................. | 324/605 |
| 4,888,989 A | * | 12/1989 | Homer | .................. | 73/304 C |
| 5,017,909 A | * | 5/1991 | Goekler | .................. | 340/620 |
| 5,042,299 A | * | 8/1991 | Wells | .................. | 73/304 C |
| 5,049,878 A | * | 9/1991 | Stern | .................. | 340/870.4 |
| 5,103,368 A | * | 4/1992 | Hart | .................. | 361/284 |
| 5,182,545 A | * | 1/1993 | Goekler et al. | .................. | 340/620 |
| 5,437,184 A | * | 8/1995 | Shillady | .................. | 73/304 C |
| 5,477,727 A | * | 12/1995 | Koga | .................. | 73/304 C |
| 5,532,527 A | * | 7/1996 | Zatler et al. | .................. | 307/118 |
| 5,611,240 A | * | 3/1997 | Yamaguchi | .................. | 73/304 C |
| 5,623,252 A | * | 4/1997 | Cacciola et al. | .................. | 340/618 |
| 5,626,052 A | * | 5/1997 | Lawson | .................. | 73/304 C |
| 5,722,290 A | * | 3/1998 | Kronberg | .................. | 73/304 C |
| 5,730,165 A | * | 3/1998 | Philipp | .................. | 137/1 |
| 5,744,968 A | * | 4/1998 | Czarnocki et al. | .................. | 324/608 |
| 5,880,538 A | * | 3/1999 | Schulz | .................. | 307/109 |
| 6,016,697 A | * | 1/2000 | McCulloch et al. | .................. | 73/304 C |
| 6,194,903 B1 | * | 2/2001 | Schultz | .................. | 324/661 |

* cited by examiner

Primary Examiner—Safet Metjahic
Assistant Examiner—Wasseem H. Hamdan
(74) Attorney, Agent, or Firm—Bryan Cave LLP

(57) ABSTRACT

A balanced charge pump sensor circuit (switched capacitor) for measuring the capacitance of a sensor element includes a switching circuit having a charging state during which the sensing element is connected to a relatively fixed upper reference voltage source. The switching circuit has a discharging state during which the sensing element is connected to a summing node, typically at some different voltage between the upper and lower reference voltages. As a result of this switching action, a packet of charge is transferred from the higher voltage connection to the lower voltage connection, the quantity of charge depending on the voltage difference between these two connections and the capacitance of the sensing element at the time the connections are changed. The circuit includes a current source, a differential amplifier having a non-inverting input terminal and an inverting input terminal, a voltage divider, and a charge integrating capacitor. The balanced charge pump circuit may be used as part of a proximity detection or level measurement system in which the sensor element is positioned within a storage tank to detect or measure the level of fluid or materials stored within the storage tank.

30 Claims, 5 Drawing Sheets

BALANCED CHARGE PUMP CAPACITIVE MATERIAL SENSOR

FIELD OF THE INVENTION

The present invention relates generally to proximity detection and level measurement and, more particularly, to electronic circuits used in capacitive sensors that determine the presence or level of an object, fluid or materials.

BACKGROUND OF THE INVENTION

A device or system having the ability to detect and/or measure the presence, level, or quantity of particular materials, commonly referred to as a proximity detector or level sensor, has many uses. For example, proximity detectors may be used to detect or sense the level of grain, aggregate, fluids or other materials in a storage container, or to detect the presence of a metal part on a production line. Capacitive sensors are extensively used for proximity detection and level measurement. A conventional capacitive sensor, which includes one or more conductive plates, is sensitive to changes in the dielectric constants of materials or fluids, and detects the presence, or lack thereof, of material in the vicinity of the plates by measuring the capacitance between the plates, which is proportional to the dielectric constant of the material filling the space between the plates. Similarly, another conventional form of capacitive sensor, which uses a sensing antenna, e.g., a long wire or strip immersed into a tank or storage bin holding a variable level of fluid or material, measures the level of the fluid or material by sensing and measuring the capacitance of the sensing antenna.

Designing and producing proximity sensors and level sensors for use in detecting and/or measuring high dielectric substances, e.g., water, salt water, and certain plastics, is relatively straightforward because the change in capacitance of even modest-sized sensing plates is large. There is a continuing need, however, for a proximity detector or level sensor capable of detecting and/or measuring materials having a low dielectric constant, such as, for example, grain, feed, diesel fuel, and gasoline. Such low dielectric constant materials are difficult to detect or measure using conventional capacitive sensors because the relatively small changes in capacitance due to the material or fluid can become hidden by drift of the sensor electronics due to, for example, variations in power supply voltages. The detection and measurement of these low dielectric materials and fluids requires exceptionally stable circuitry to make such measurements practical. Thus, there is a continuing need for a capacitive sensor that is less susceptible to certain environmental conditions such as temperature variations and variations in the components used in the electronic circuitry associated with the sensor.

Calvin U.S. Pat. No. 4,345,167 illustrates one prior art electronic circuit used in a switched capacitive sensor. Such a circuit is illustrated in prior art FIG. 1, in which the electronic switch, oscillates between the reference voltage node V1 and the node connected to the current-to-voltage circuitry at a particular frequency. Thus, the sensing antenna is repetitively charged to the reference voltage V1 and then discharged, generating a current proportional to the amount of charge on the antenna. The current-to-voltage circuitry generates an output voltage Vo, that is proportional to the capacitance on the sensing antenna. A variation is illustrated in Philipp U.S. Pat. No. 5,730,165, which discloses a charge integrating capacitor, a simplified version of which is illustrated in prior art FIG. 2. In this circuit, the switch is cycled a predetermined number of times, injecting charge into a capacitor, which increases the voltage across the capacitor slightly each cycle. The amplifier measures the voltage across the capacitor after the switch has cycled the predetermined number of times. Each of these two prior art circuits operate by alternatively charging and discharging a sensing plate or antenna between two voltages. The electronic charge required to effect this change in voltage is proportional to the capacitance of the plate or antenna and the magnitude of the voltage change according to the equation, $q=\Delta VC$. The capacitance between the two electrodes (e.g., plates) is proportional to the dielectric constant of the materials and/or fluids in the vicinity of the electrodes. The capacitance is based on the geometry of the electrodes and may be represented by, $C=\epsilon_r C_0$, where $C_0$ is the capacitance between the electrodes with only air present therebetween, and $\epsilon_r$ is the effective relative dielectric constant of the material and/or fluid between the electrodes. If the material or fluid does not completely fill the space between the electrodes, then the effective dielectric constant will be reduced from that of the material or fluid. The effective dielectric constant for the electrode arrangement, however, does not need to be calculated, only the change in capacitance of the sensor.

The prior art switched capacitor or charge pump sensor circuits measure the change in capacitance by measuring the change in charge required to change the voltage on the sensing electrode, by alternatively connecting the sensing electrode to a reference voltage, $V_1$, and then to a second voltage, $V_2$ (which may be ground). This change in charge may be represented by:

$$\Delta q = (V_1 - V_2) \epsilon_r C_0$$

After the electrode has charged to $V_2$, it is immediately re-connected to the reference voltage, $V_1$. If this switching sequence is repeated at some frequency $f$, then the repetitive injection of this charge $\Delta q$ represents a current that is proportional to the effective dielectric constant according to:

$$I(\epsilon_r) = (V_1 - V_2) \epsilon_r C_0 f$$

This prior art sensing technique can be used as a proximity detector by merely detecting when the current exceeds a certain threshold value. Alternatively, if the conventional two plate sensing electrode is replaced by a wire (or pair of wires) immersed into a tank of fluid or granular material, the capacitance of the wire will vary as the level of material changes. This latter arrangement results in a material or fluid level sensor.

When using proximity detectors or level sensors with materials or fluids having high dielectric constants, such as aqueous solutions or pellets of high dielectric constant plastics, the change in capacitance, and therefore the change in current, is very pronounced and relatively easy to detect. For low dielectric constant materials or fluids, such as, for example, grain, feed, diesel fuel, gasoline, and certain low dielectric plastics, the change in capacitance is very slight, for example only a change of a few percent (as compared to doubling or tripling the capacitance in the high dielectric constant applications). This results in a relatively large current without the material present and only a slightly larger current when the material to be detected is present. To make this small change in current more apparent in some devices, a fixed current (which may be approximated by a resistor coupled between the second reference voltage and ground potential) is typically subtracted from the signal current. Thus, if the fixed current is adjusted to be approximately equal to the current when no material is present, then the material will produce a large relative change in net current.

Each of these prior art techniques is dependent on the stability of the reference supply voltage. The sensor current depends directly on the magnitude of the change in voltage. As the reference supply voltage fluctuates, the sensor current will also fluctuate. This dependence on the stability of the reference supply voltages is a limitation of this technique. A need remains, therefore, for a circuit used in capacitive sensors that is less susceptible to fluctuations in the reference supply voltages. Preferably, the circuit will directly and automatically compensate for variations in the reference supply voltages.

SUMMARY OF THE INVENTION

An improved circuit for detecting the change in capacitance of a sensing electrode that is less sensitive to fluctuations in supply voltage has now been developed. The circuit substantially improves the accuracy of a proximity detector or level sensor while minimizing adverse effects due to ambient conditions and electrical component variations. The present invention directly and automatically compensates for expected variations in the reference voltages commonly used in conventional switched capacitor or charge pump capacitive sensors. The circuit described herein controls a current source so that it varies proportionally to the supply voltages governing the input voltages to a comparator or differential amplifier. This results in a sensor that is an order of magnitude more stable over temperature, reference supply voltage fluctuations, and certain component parameter drifts over the usable life of the sensor. As a result of this improved stability, small capacitances can be reliably discerned, or conversely, low dielectric constant materials and fluids can be sensed and/or measured. Using the novel circuit described herein, proximity sensors and material or fluid level sensors can be designed that can sense or measure materials or fluids that previously had been too difficult to detect and/or measure reliably.

In one embodiment of a balanced charge pump circuit disclosed herein for measuring the capacitance of a sensor element, the capacitive sensor element is coupled through a switching circuit. The switching circuit preferably has a charging state during which the sensing element is connected to a relatively fixed upper reference voltage source. The switching circuit also preferably has a discharging state during which the sensing element is connected to a summing node, typically at some different voltage between the upper and lower reference voltages. The switching circuit also preferably assures that the sensing element is disconnected from both the upper reference voltage source and the summing node at least briefly between these two connected states. As a result of this switching action, a packet of charge is transferred from the higher voltage connection to the lower voltage connection, the quantity of charge depending on the voltage difference between these two connections and the capacitance of the sensing element at the time the connections are changed.

The balanced charge pump circuit includes a summing node coupled to the sensor element during one of the switching states described above. The pump circuit also includes a current source, such as a current drain resistor, having one terminal connected to the summing node and the other terminal connected to a fixed lower reference voltage source. This lower reference voltage source is maintained at approximately the same voltage with respect to the upper reference voltage source using conventional voltage regulators, batteries, and the like. This drain resistor is designed to drain away from the summing node, on average, exactly the same quantity of charge per second as the sensing element and switching circuits are transferring into the summing node at some particular exact value of sensing element capacitance when the summing node is at some particular design voltage. The circuit also includes a differential amplifier having a non-inverting input terminal and an inverting input terminal, in which inverting input terminal is coupled to the summing node. A feedback impedance, typically either a resistance or a capacitance, or both, may be included to connect the output of the differential amplifier to the inverting input. This feedback impedance contributes an additional current to the summing node and therefore affects the voltage of the summing node along with the sensing element and switches and the drain resistor. In addition, a voltage divider, which may be a pair of voltage dividing resistors arranged in series, is coupled to the non-inverting input terminal of the differential amplifier to maintain the voltage at the non-inverting input terminal equivalent to a proportion of the voltage of the upper reference voltage source. The differential amplifier generates a voltage differential signal at an output terminal representative of the discharge current from, and the capacitance of, the sensor element. A charge integrating capacitor is preferably coupled between the summing node and the non-inverting input terminal of the differential amplifier to smooth out the current pulses flowing into the summing node each time the sensing element is connected to the summing node.

The balanced charge pump circuit may be used as part of a proximity detection or level measurement system in which the sensor element is positioned within a storage tank to detect or measure the level of fluid or materials stored within the storage tank. The sensor element may include spaced apart first and second electrodes and be positioned within the storage tank to receive the fluid or materials between the electrodes during use. The capacitance between the electrodes will then vary as a function of the fluid or material level height in the storage tank. The balanced charge pump circuit produces an output signal indicative of the level of fluid or materials contained within a storage tank.

BRIEF DESCRIPTION OF THE DRAWINGS

These and other features, aspects, and advantages of the present invention will become better understood with regard to the following description, appended claims, and accompanying drawings wherein:

These drawings are provided for illustrative purposes only and should not be used to unduly limit the scope of the present invention.

DETAILED DESCRIPTION OF THE INVENTION

Figure 3:
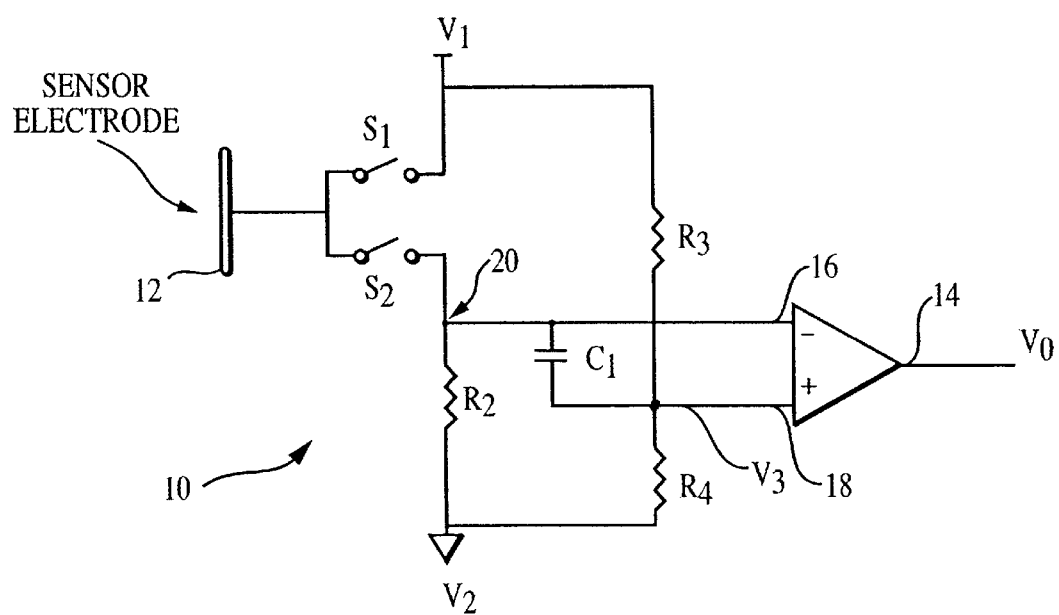
FIG. 3 is a schematic diagram of a balanced charge pump circuit configured as a proximity detector according to an embodiment of the present invention.

FIG. 3 illustrates a preferred embodiment of the balanced charge pump circuit 10 of the present invention configured for use as a proximity detector. The balanced charge pump circuit 10 may be used in many applications where a quantity of interest can be related to a capacitance. This includes sensing the presence or absence of materials, determining that the level of a particulate or liquid material is at, or not at, some set level, and determining the position of a rotary or linear mechanism.

The charge pump circuit 10 is coupled to a sensing element 12, which may consist of a single conducting plate, a pair of plates (not necessarily the same size or shape), a single wire, a pair of wires, coaxial wires and/or tubes, as well as many other configurations suitable for the given material and physical constraints. The primary requirement on the sensing element 12 is that the capacitance of the element 12 depend in some reliable way on the desired measurement property, e.g. the presence or level of some material, or a change in dielectric constant.

The charge pump circuit 10 is coupled to two source voltages—an upper reference voltage source V1 and a lower reference voltage source V2. Typically, the lower reference voltage source V2 will be at ground potential.

Resistors R3 and R4 arranged in series form a voltage divider between the two reference voltage sources, V1 and V2. The voltage V3 at the node between the two resistors is determined by R3 and R4 and is given by:

$$V_3 = V_2 + \frac{R_4}{R_3 + R_4} \cdot (V_1 - V_2) \tag{1}$$

Figure 1:
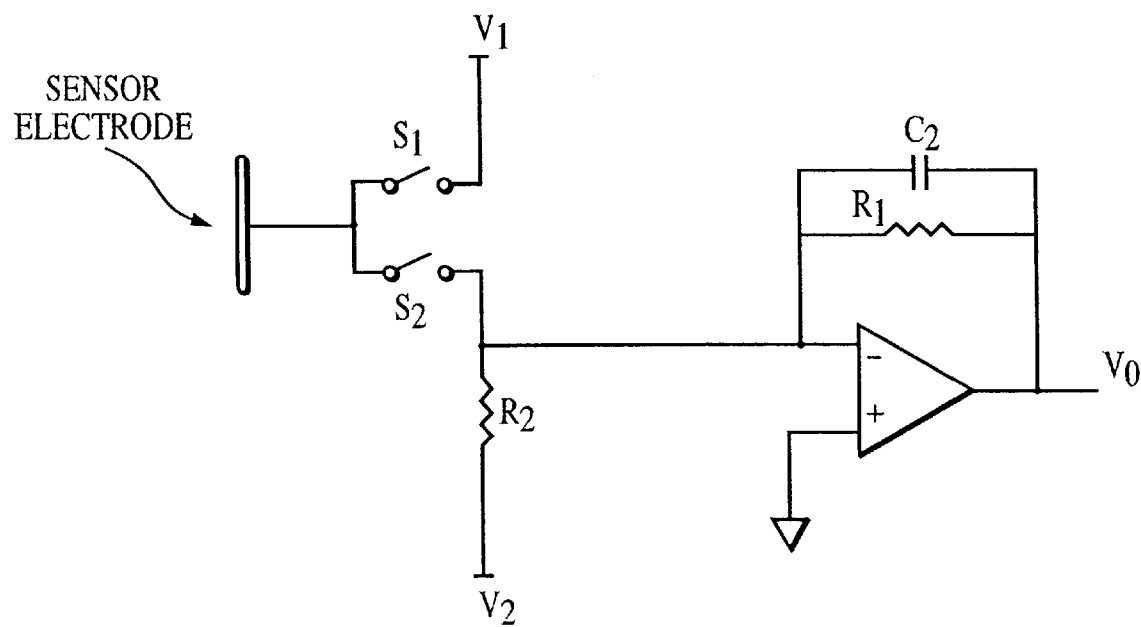
FIG. 1 illustrates a prior art electronic circuit used in a switched capacitive sensor.
Figure 2:
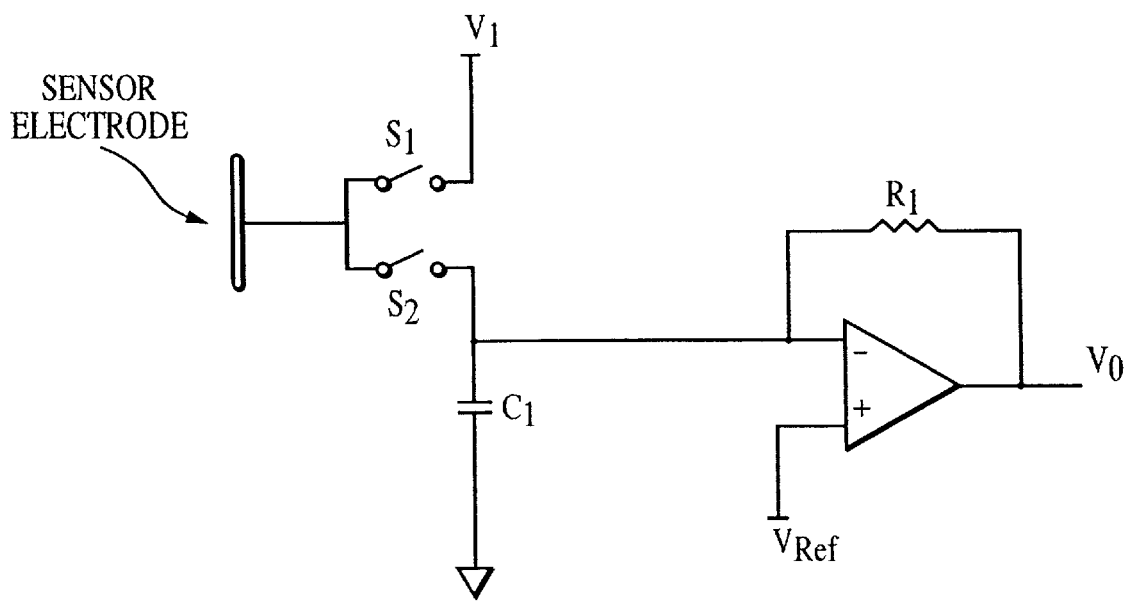
FIG. 2 illustrates a prior art electronic circuit used with a capacitive sensor and having a charge integrating capacitor.

The charge pump circuit 10 includes a switching circuit, shown in FIG. 1 as switches S1 and S2. The sensor element 12 is connected to switch S1, coupling the sensor element 12 to the upper reference voltage source V1, and S2, coupling the sensor element 12 to a summing node 20. Switches S1 and S2 can be mechanical switches actuated either electrically (i.e. relays) or mechanically, or they may be solid state switches, for example a CMOS switch. In operation, switches S1 and S2 are never connected at the same time. First, switch S1 connects the sensor element 12 to the upper reference voltage source V1 and charges the sensor element 12 to a voltage approximately equal to the upper reference voltage source V1. Next, switch S1 is opened and switch S2 is closed, connecting the sensor element 12 to the summing node 20, which is at some voltage V4. The amount of charge transferred into the summing node 20 is $$Q_s = (V_1 - V_4) C_s \tag{2}$$

If switches S1 and S2 are opened and closed repetitively as described above at a frequency $f$, then charge is pumped into the summing node 20 at a rate, or current, equal to:

$$I_s = (V_1 - V_4) C_s f \tag{3}$$

An equivalent resistance can be attributed to this arrangement of $C_s$ (the effective capacitance of the sensor element 1), switches S1 and S2 operated in this way:

$$R_s = \frac{1}{C_s f} \tag{4}$$

A current source such as current draining resistor R2 is preferably coupled between the summing node 20 and the lower reference voltage source V2 to drain charge out of the summing node 20 at a rate, or current, equal to:

$$I_d = \frac{(V_4 - V_2)}{R_2} \tag{5}$$

The current draining resistor R2 attempts to draining current out of the summing node 20 and to pull the summing node 20 to the voltage of the lower reference voltage source V2. If, as shown in FIG. 3, there are no other connections to the summing node 20, then these two currents must be equal (assuming the inputs to the comparator 14 do not source or sink a significant current). In this case $I_s = I_d$ and the voltage at the summing node V4 will stabilize at:

$$V_4 = V_2 + \frac{R_2}{\frac{1}{C_s f} + R_2} \cdot (V_1 - V_2) \tag{6}$$

The voltage V3 is connected to the non-inverting input 18 on a comparator 14 and serves as a reference level. The summing node 20 is coupled to the inverting input 16 of the comparator 14. The output Vo of the comparator 14 will switch from high to low, or from low to high, when the voltage at the summing node 20 equals the voltage at the node between the two resistors R3 and R4 forming the voltage divider, V3. This occurs when the capacitance of the sensor element 12 ($C_s$) has the value:

$$C_{s0} = \frac{R_4}{R_2 R_3 f} \tag{7}$$

The charge pump circuit 10 also includes a charge integrating capacitor C1 coupled between the summing node 20 and non-inverting input 18 of the comparator 14. This charge integrating capacitor C1 is required for the circuit 10 to operate correctly when using a bipolar comparator. Its function is to reduce the voltage transients each time switch S2 closes. Without this capacitor C1 there will be large transient voltages across the inverting input 16 of the comparator 14 and the non-inverting input 18 of the comparator 14. These large voltages will result in conduction in the input protection circuits common to bipolar comparator and op-amp inputs, and these currents would invalidate the assumptions stated above, resulting in inaccurate sensing. As those skilled in the art will appreciate, capacitor C1 may not be necessary if the circuit is designed using a different form of comparator 14, such as a CMOS or JFET comparator.

Circuit 10 operated in this manner functions as a proximity detector, wherein the output Vo of the comparator 14 changes state whenever the capacitance of the sensor element 12 rises above or drops below a threshold capacitance. The key advantage of this invention is that this threshold capacitance does not depend on (V1−V2), only on the ratios of the resistances R2, R3, and R4 and on the frequency $f$ as shown in equation (7). Because of this, the upper and lower reference voltage sources V1 and V2 can be provided by any reasonably well-regulated voltage source. Typically V1 would be regulated by a solid-state voltage regulator and V2 would be ground.

Figure 4:
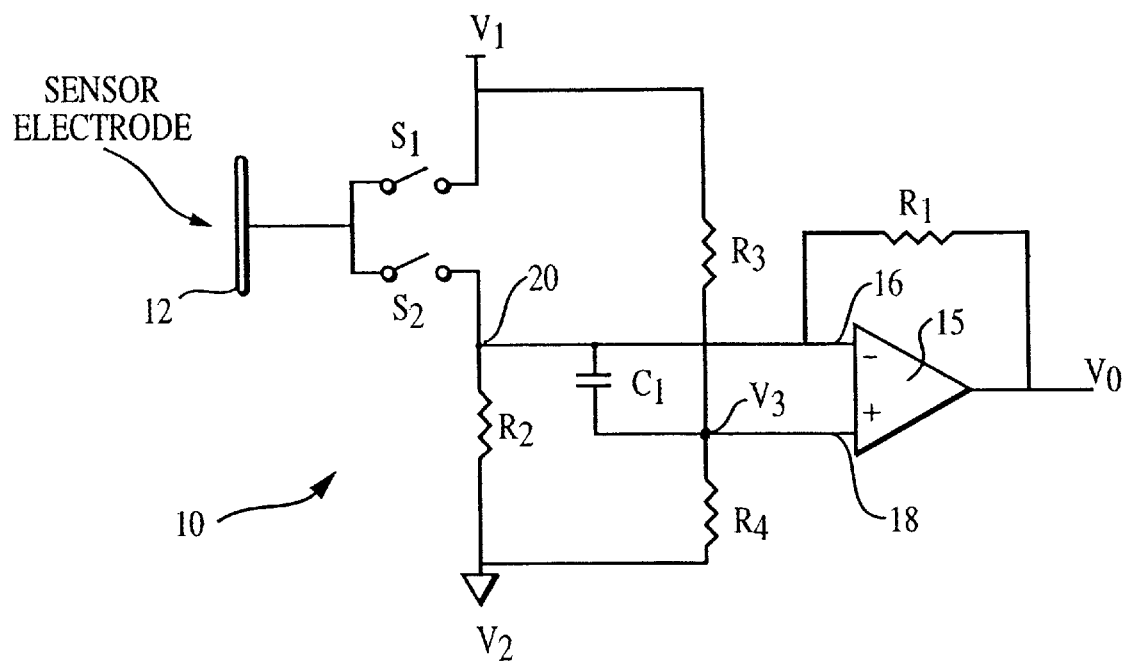
FIG. 4 is a schematic diagram of a balanced charge pump circuit configures as a level sensor.

FIG. 4 shows another preferred implementation of this invention. Instead of the comparator 14 of FIG. 3, a differential amplifier 15 is included in the charge pump circuit 10. A filter network, with resistor R1 connecting the output Vo of the differential amplifier 15 to its inverting input 16, which is connected to the summing node 20. The voltage V3 derived from the voltage divider formed by R3 and R4 is connected to the non-inverting input 18 of the differential amplifier 15. The amplifier output Vo will attempt go to a voltage such that the inverting input and the non-inverting input have the same voltage. When the capacitance of the sensor element 12 ($C_s$) has the same value given in equation (7) the amplifier output will be Vo=V3. For other values of $C_s$ the output voltage will be:

$$V_0 = V_3 + \frac{R_1 R_3 f}{R_3 + R_4}(C_s - C_{s0})(V_1 - V_2) \quad (8)$$

Note that this output is proportional to the difference between the actual capacitance of the sensing element 12 ($C_s$) and a fixed capacitance $C_{s0}$ determined by the circuit elements $R_2, R_3, R_4$, and $f$ per equation (7). This implementation is thus useful for measuring small changes in capacitance in the presence of a large fixed capacitance. Examples of such applications include sensing the levels of low dielectric constant fluids such as diesel fuel, gasoline, other hydrocarbon liquids or powders, and sensing the positions of mechanical elements.

Figure 5:
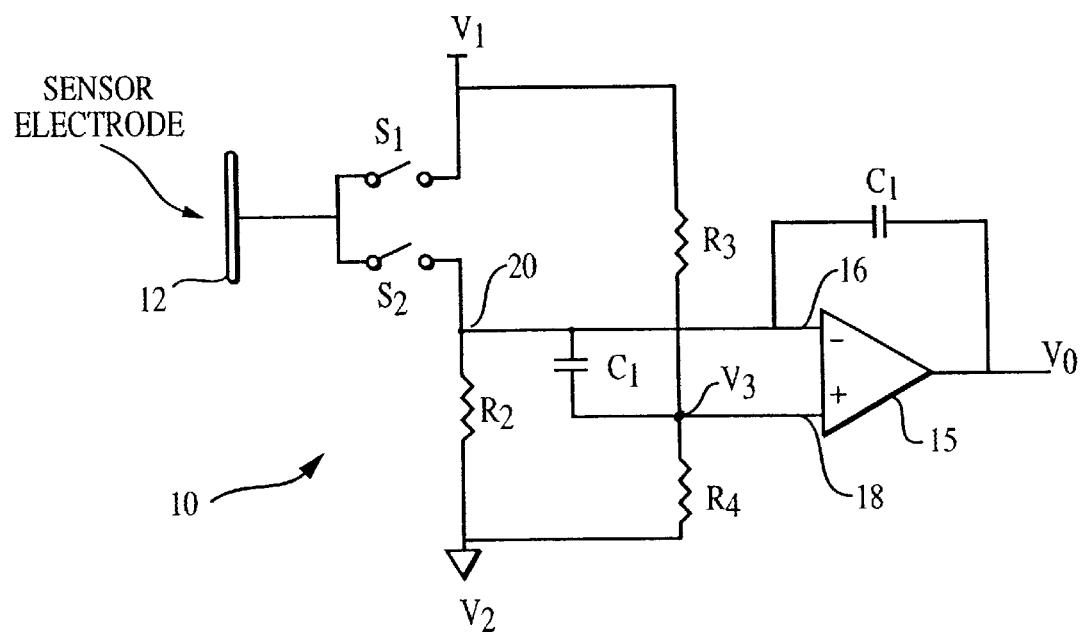
FIG. 5 is a schematic diagram of another embodiment of a balanced charge pump circuit.

FIG. 5 shows another preferred implementation of this invention, in which the charge pump circuit 10 is configured as a proximity detector with a capacitor used in the filter network to slow down and filter the response time. Thus, the resistor R2 of FIG. 4 is replaced by a feedback capacitor C2. This circuit 10 will operate like the proximity detector in FIG. 3, but the amplifier 15 and the capacitor C2 act together as an integrator. This is useful where there might be noise present that would briefly affect the capacitance measurement, or when a slight time delay is desired.

In yet another embodiment not shown in the drawings, the filter network could include both capacitor C2 and resistor R1 used together to give a proportional output similar to FIG. 4, but with a filtered response to better reject noise.

In FIGS. 3, 4, and 5, resistors $R_2$, $R_3$, $R_4$, although represented here as resistors, in practice each may be implemented as either resistors, as shown, or as switched capacitors similar to Cs, S1 and S2. In the later case, the equivalent resistance is given by equation (4).

A sensor including the charge pump circuit of the present invention may be used in a number of applications, including sensing the presence or absence, and/or to measure the level, of fluids, such as water, milk, detergent, oil, fiuels, and various chemical solutions, powders, and granular materials, including grain, feed, plastic pellets, rock, gravel, and metals. These fluids or materials may be stored in bins, tanks, hoppers, or open ponds. The materials or fluids may also be sensed as they are transported in pipes or conveyer systems. The present invention may also be used to measure the position of objects wherein the position effects a change in capacitance, such as door positions, hydraulic cylinder extension, and the angular position of an object. Furthermore, the novel circuit may be used in systems detecting the movement of objects within some volume of space defined by the electric fields surrounding the sensing electrode. Such use may be for verification of the position of a mechanical actuator, to verify that a part is properly positioned within a machine, as a burglar alarm or intrusion detection, such as to protect valuables in a display case.

Although the present invention has been described in considerable detail with reference to certain presently preferred embodiments thereof, other embodiments are possible without departing from the spirit and scope of the present invention. The appended claims, therefore, should not be limited to the description of the preferred versions contained herein.

I claim:

1. A balanced charge pump circuit for coupling to a capacitive sensor element through a switching circuit for measuring the capacitance of the sensor element, wherein the switching circuit has a charging state for coupling the capacitive sensor element to an upper reference voltage source to charge the sensor element to a predetermined voltage and a discharging state in which a discharge current representative of the capacitance of the sensor element is transferred through the switching circuit, the switching circuit cycling between its charging and discharging states, the balanced charge pump circuit comprising:
   a summing node coupled to the sensor element to receive discharge current when the switching circuit is in its discharging state;
   a current source having a first terminal coupled to the summing node and a second terminal coupled to a lower reference voltage source for generating a source current when the summing node is coupled to the sensor element to drain current from the summing node and to offset the amount of discharge current otherwise flowing through the summing node;
   a differential amplifier having a non-inverting input terminal and a inverting input terminal, wherein the inverting input terminal is coupled to the summing node, the differential amplifier generating a voltage differential signal at an output terminal representative of the discharge current from, and the capacitance of, the sensor element; and
   a voltage divider coupled to the non-inverting input terminal of the differential amplifier that maintains the voltage at the non-inverting input terminal equivalent to a proportion of the voltage of the upper reference voltage source;
   wherein the balanced charge pump circuit discharges the sensor element when the sensor element is decoupled from the upper reference voltage source and generates the voltage differential signal representative of the capacitance of the sensor element.

2. The balanced charge pump circuit of claim 1 further comprising a charge integrating capacitor coupled between the summing node and the non-inverting input terminal of the differential amplifier to absorb AC currents flowing into the summing node.

3. The balanced charge pump circuit of claim 1 further comprising a filter network coupled between the output terminal of the differential amplifier and the inverting input terminal of the differential amplifier.

4. The balanced charge pump circuit of claim 3 wherein the filter network comprises a feedback resistor.

5. The balanced charge pump circuit of claim 3 wherein the filter network comprises a feedback capacitor designed to slow down the rate of change of the voltage at the output terminal.

6. The balanced charge pump circuit of claim 5 wherein the filter network further comprises a feedback resistor coupled in parallel with the feedback capacitor between the output and inverting terminals of the differential amplifier.

7. The balanced charge pump circuit of claim 1 further comprising:
   a charge integrating capacitor coupled between the summing node and the non-inverting input terminal of the differential amplifier to absorb current flowing into the summing node; and
   a filter network coupled between the output terminal of the differential amplifier and the inverting input terminal of the differential amplifier.

8. The balanced charge pump circuit of claim 1 wherein the current source comprises a current drain resistor having a value selected to drain out current accumulated at the summing node.

9. The balanced charge pump circuit of claim 1 wherein the voltage divider comprises a first and a second voltage dividing resistor, the first voltage dividing resistor coupled between the upper reference voltage source and the non-inverting input terminal of the differential amplifier and the second voltage dividing resistor coupled between the non-inverting input terminal and the lower reference voltage source.

10. The balanced charge pump circuit of claim 9 wherein the first and second voltage dividing resistors have substantially identical resistive values such that the voltage at the non-inverting terminal of the differential amplifier is substantially equal to the average of the voltage of the upper reference voltage source and the voltage of the lower reference voltage source.

11. The balanced charge pump circuit of claim 1 wherein the sensor element is positioned within a storage tank to detect or measure the level of fluid or materials stored within the storage tank and wherein the balanced charge pump circuit produces an output signal indicative of the level of fluid or materials contained within a storage tank.

12. The balanced charge pump circuit of claim 11 wherein the sensor element comprises spaced apart first and second electrodes, and wherein the sensor element is positioned within the storage tank to receive the fluid or materials between the electrodes during use, the capacitance between the electrodes varying as a function of the fluid or material level height in the storage tank.

13. The balanced charge pump circuit of claim 1 wherein the switching circuit is temporarily disconnected between its charging and discharging states.

14. A balanced charge pump circuit for coupling to a capacitive sensor element through a switching circuit for measuring the capacitance of the sensor element, wherein the switching circuit has a charging state for coupling the capacitive sensor element to an upper reference voltage source to charge the sensor element to a predetermined voltage and a discharging state in which a discharge current representative of the capacitance of the sensor element is transferred through the switching circuit, the switching circuit cycling between its charging and discharging states, the balanced charge pump circuit comprising:

a summing node coupled to the sensor element to receive discharge current when the switching circuit is in its discharging state;

a current source having a first terminal coupled to the summing node and a second terminal coupled to a lower reference voltage source for generating a source current when the summing node is coupled to the sensor element to drain current from the summing node and to offset the amount of discharge current otherwise flowing through the summing node;

a comparator having a non-inverting input terminal, an inverting input terminal, and an output terminal, wherein the inverting input terminal is coupled to the summing node, the comparator generating a voltage output signal at the output terminal when the voltage at its inverting input terminal is substantially equal to the voltage at its non-inverting terminal;

a charge integrating capacitor coupled between the summing node and the non-inverting input terminal of the comparator to absorb AC currents flowing into the summing node; and a voltage divider coupled to the non-inverting input terminal of the comparator that maintains the voltage at the non-inverting input terminal equivalent to a proportion of the voltage of the upper reference voltage source.

15. The balanced charge pump circuit of claim 14 wherein the current source comprises a current drain resistor having a value selected to drain out current accumulated at the summing node.

16. The balanced charge pump circuit of claim 14 wherein the voltage divider comprises a first and a second voltage dividing resistor, the first voltage dividing resistor coupled between the upper reference voltage source and the non-inverting input terminal of the differential amplifier and the second voltage dividing resistor coupled between the non-inverting input terminal and the lower reference voltage source.

17. The balanced charge pump circuit of claim 16 wherein the first and second voltage dividing resistors have substantially identical resistive values such that the voltage at the non-inverting terminal of the differential amplifier is substantially equal to the average of the voltage of the upper reference voltage source and the voltage of the lower reference voltage source.

18. The balanced charge pump circuit of claim 14 wherein the switching circuit is temporarily disconnected between its charging and discharging states.

19. A level sensor for developing an output signal indicative of the level of fluid or materials contained within a storage tank, comprising:

a sensor element having spaced apart first and second electrodes, the sensor element positioned within the storage tank to receive the fluid or materials between the electrodes during use, the capacitance between the electrodes varying as a function of the fluid or material level height in the storage tank;

an upper reference voltage source and a lower reference voltage source;

a switching circuit having a charging state for coupling the sensor element to the upper reference voltage source to charge the electrodes to a predetermined voltage and a discharging state in which a discharge current representative of the capacitance of the sensor element is transferred through the switching circuit, the switching circuit cycling between its charging and discharging states; and a current to voltage measurement circuit coupled to the switching circuit for discharging the electrodes when the sensor element is decoupled from the upper reference voltage source and for generating a voltage differential signal representative of the capacitance of the sensor element and the level of the fluid or materials contained within the storage tank, the voltage measurement circuit comprising:

a summing node coupled to the sensor element when the switching circuit is in its discharging state;

a current source having an input coupled to the summing node and an output coupled to the lower reference voltage source for generating a source current when the summing node is coupled to the sensor element to drain current from the summing node and to offset the amount of discharge current otherwise flowing through the summing node;

a differential amplifier having a non-inverting input terminal and a inverting input terminal, wherein the inverting input terminal is coupled to the summing node, the differential amplifier generating the voltage differential signal at an output terminal representative of the discharge current from, and the capacitance of, the sensor element;

a charge integrating capacitor coupled between the summing node and the non-inverting input terminal of the differential amplifier to absorb AC currents flowing into the summing node;

a voltage divider coupled to the non-inverting input terminal of the differential amplifier that maintains the voltage at the non-inverting input terminal equivalent to a proportion of the voltage of the upper reference voltage source; and a filter network coupled between the output terminal of the differential amplifier and the inverting input terminal of the differential amplifier.

20. The level sensor of claim 19 wherein the current source comprises a current drain resistor having a value selected to drain out the current accumulated at the summing node.

21. The level sensor of claim 19 wherein the voltage divider comprises a first and a second voltage dividing resistor, the first voltage dividing resistor coupled between the upper reference voltage source and the non-inverting input terminal of the differential amplifier and the second voltage dividing resistor coupled between the non-inverting input terminal and the lower reference voltage source.

22. The level sensor of claim 21 wherein the first and second voltage dividing resistors have substantially identical resistive values such that the voltage at the non-inverting terminal of the differential amplifier is substantially equal to the average of the voltage of the upper reference voltage source and the voltage of the lower reference voltage source.

23. The level sensor of claim 19 wherein the filter network comprises a feedback capacitor designed to slow down the rate of change of the voltage at the output terminal.

24. The level sensor of claim 23 wherein the filter network further comprises a feedback resistor coupled in parallel with the feedback capacitor between the output and inverting terminals of the differential amplifier.

25. The level sensor of claim 19 wherein the switching circuit is temporarily disconnected between its charging and discharging states.

26. A proximity detector comprising:

a sensor element;

an upper reference voltage source and a lower reference voltage source;

a switching circuit having a charging state for coupling the sensor element to the upper reference voltage source to charge the sensor element to a predetermined voltage and a discharging state in which a discharge current representative of the capacitance of the sensor element is transferred through the switching circuit, the switching circuit cycling between its charging and discharging states; and a current to voltage measurement circuit coupled to the switching circuit for discharging the electrodes when the sensor element is decoupled from the upper reference voltage source and for generating a detection signal representative of the capacitance of the sensor element, the voltage measurement circuit comprising:

a summing node coupled to the sensor element to receive discharge current when the switching circuit is in its discharging state;

a current source having a first terminal coupled to the summing node and a second terminal coupled to a lower reference voltage source for generating a source current when the summing node is coupled to the sensor element to drain current from the summing node and to offset the amount of discharge current otherwise flowing through the summing node;

a comparator having a non-inverting input terminal, an inverting input terminal, and an output terminal, wherein the inverting input terminal is coupled to the summing node, the comparator generating a voltage output signal at the output terminal when the voltage at its inverting input terminal is substantially equal to the voltage at its non-inverting terminal;

a charge integrating capacitor coupled between the summing node and the non-inverting input terminal of the comparator to absorb current flowing into the summing node; and a voltage divider coupled to the non-inverting input terminal of the comparator that maintains the voltage at the non-inverting input terminal equivalent to a proportion of the voltage of the upper reference voltage source.

27. The balanced charge pump circuit of claim 26 wherein the current source comprises a current drain resistor having a value selected to drain out current accumulated at the summing node.

28. The balanced charge pump circuit of claim 26 wherein the voltage divider comprises a first and a second voltage dividing resistor, the first voltage dividing resistor coupled between the upper reference voltage source and the non-inverting input terminal of the differential amplifier and the second voltage dividing resistor coupled between the non-inverting input terminal and the lower reference voltage source.

29. The balanced charge pump circuit of claim 28 wherein the first and second voltage dividing resistors have substantially identical resistive values such that the voltage at the non-inverting terminal of the differential amplifier is substantially equal to the average of the voltage of the upper reference voltage source and the voltage of the lower reference voltage source.

30. The balanced charge pump circuit of claim 26 wherein the switching circuit is temporarily disconnected between its charging and discharging states.

* * * * *